United States Patent [19]

Yamashita

[11] Patent Number: 4,956,719
[45] Date of Patent: Sep. 11, 1990

[54] LOW-FREQUENCY CONVERTER FOR CARRIER CHROMINANCE SIGNAL

[75] Inventor: Hiromitsy Yamashita, Itami, Japan

[73] Assignee: Mitsubishi Denki Kabushiki Kaisha, Tokyo, Japan

[21] Appl. No.: 199,342

[22] Filed: May 26, 1988

[30] Foreign Application Priority Data

Jul. 30, 1987 [JP] Japan .................. 62-191694

[51] Int. Cl.$^5$ .......................... H04N 5/76; H04N 9/80
[52] U.S. Cl. ..................................... 358/310; 358/330
[58] Field of Search ............... 358/326, 328, 321, 330, 358/25, 310

[56] References Cited

U.S. PATENT DOCUMENTS

| 4,400,742 | 8/1983 | Yamamitsu et al. | 358/324 |
| 4,415,935 | 11/1983 | Suzuki | 358/324 |
| 4,573,086 | 2/1986 | Sakai et al. | 358/330 |
| 4,661,863 | 4/1987 | Ishinoi | 358/330 |
| 4,672,468 | 6/1987 | Okada et al. | 358/310 |
| 4,677,497 | 6/1987 | Yoshinaka | 358/330 |
| 4,754,340 | 6/1988 | Nakagawa et al. | 358/324 |
| 4,807,048 | 2/1989 | Yasuda | 358/324 |

FOREIGN PATENT DOCUMENTS 5725116 6/1984 Japan .
539928 11/1989 Japan .

OTHER PUBLICATIONS

Monthly Magazine "Television Technics", Published by Denshigijutsu Shuppansha, Jun. 1984, pp. 57–61.
"New Chrominance Signal Processing LSI For Home VCR", IEEE Transactions on Consumer Electronics, vol. CE-26, Aug. 1980, pp. 315–321.
"Advanced and Simplified Signal Processing System for VTR and its High Performance LSI's", IEEE Transactions on Consumer Electronics, vol. CE-24, No. 3, Aug. 1987, pp. 458–467.
"Video Cassette Recorder Development for Consumers", IEEE Transactions on Consumer Electronics, vol. CE-24, No. 3, Aug. 1987, pp. 468–472.

Primary Examiner—Robert L. Richardson
Attorney, Agent, or Firm—Oblon, Spivak, McClelland, Maier & Neustadt

[57] ABSTRACT

A signal, which is synchronous with the horizontal synchronizing signal, is converted by frequency conversion means formed by a PLL circuit and a frequency divider into a continuous wave signal having a frequency equal to the sum of or the difference between the frequencies of a carrier chrominance signal and a low-frequency conversion chrominance signal. A multiplier multiplies the carrier chrominance signal by the continuous wave signal. An output signal from the multiplier is supplied to a low-pass filter to obtain the low-frequency conversion chrominance signal.

8 Claims, 5 Drawing Sheets

LOW-FREQUENCY CONVERTER FOR CARRIER CHROMINANCE SIGNAL

BACKGROUND OF THE INVENTION

1. Field of the Invention

The present invention relates to a frequency converter for performing low-frequency conversion of a carrier chrominance signal, in order to record a color video signal on a magnetic tape or the like.

2. Description of the Background Art

FIG. 1 is a block diagram showing a conventional low-frequency converter for a carrier chrominance signal, which is employed in a video tape recorder. Such a structure is disclosed in the MITSUBISHI DENKI TECHNICAL REPORT Vol. 60, No. 7, 1986, pp. 64–66, for example. Referring to FIG. 1, an input 1 receives a carrier chrominance signal having a color subcarrier frequency $f_{sc}$ and another input 2 receives a signal which is synchronous with a horizontal synchronizing signal having a horizontal synchronizing frequency $f_H$, such as a signal obtained by triggering a one-shot multivibrator by the horizontal synchronizing signal.

The carrier chrominance signal is supplied to a switching circuit 3 generally called a burst gate. The burst gate 3 is opened only in a color burst signal period so that a color burst signal is extracted from the carrier chrominance signal to be supplied to a multiplier 5 of a phase-locked-loop (hereinafter referred to as PLL) circuit 4. The multiplier 5 multiplies the supplied color burst signal by an output signal from a voltage control oscillator (hereinafter referred to as VCO) 6 in order to perform phase detection. Only a low-frequency component of the phase detection output is supplied to a control input of the VCO 6 through a low-pass filter (hereinafter referred to as LPF) 7. Thus, the output signal of the VCO 6 is stabilized at the same frequency and phase by the color burst signal. This loop of the PLL circuit 4 is called an APC (automatic phase control) loop.

A signal, which is synchronous with the horizontal synchronizing signal, is received through the input terminal 2 and is fed to a multiplier 9 of another PLL circuit 8. The multiplier 9 multiplies this synchronous signal by a signal obtained through frequency division by a frequency divider 11 of an output signal from a VCO 10, in order to provide phase detection. Only a low-frequency component of the phase detection output is supplied to a control input of the VCO 10 through an LPF 12. When the carrier chrominance signal is in the NTSC (National Television System Committee) system and the video tape recorder is in the VHS recording system, the divisional ratio of the frequency divider 11 is selected at 1/320, for example. In this case, the output signal from the VCO 10 is stabilized in the same phase with the horizontal synchronizing signal at a frequency of 320 $f_H$. This loop of the PLL circuit 8 is called an AFC (automatic frequency control) loop.

The output signal from the VCO 10 is frequency-divided by a frequency divider 13. The divisional ratio of the frequency divider 13 is selected at ⅛, for example, so that a signal having a frequency of 40 $f_H$ is obtained at its output. The frequency divider 13 also serves as a phase transition switching circuit in the VHS system, to rotate the phase of an output signal by 90° for each horizontal synchronizing period and reverse the direction of phase rotation field by field. Such processing, generally called PS (phase shift) processing, is for preventing crosstalk from an adjacent track. PI (phase invert) processing is performed in the case of the beta system.

The output signals from the VCO 6 and the frequency divider 13 are inputted in a multiplier 14, which is called a sub-balanced modulator. The multiplier 14 multiplies the two signals having the frequencies of $f_{SC}$ and 40 $f_H$, respectively, by each other, to output a signal including two frequency components of $f_{SC} \pm 40 f_H$. Within this signal, only the frequency component of $f_{SC} + 40 f_H$ is extracted by a bandpass filter (hereinafter referred to as BPF) 15, which is, in turn, inputted in a multiplier 16 called a main balanced modulator.

The multiplier 16 also receives the carrier chrominance signal which is supplied to the input 1. The multiplier 16 multiplies the two input signals having the frequencies of $f_{SC}$ and $f_{SC} + 40 f_H$ by each other, to output a signal including two frequency components of $f_{SC} \pm (f_{SC} + 40 f_H)$. Within this signal, only the frequency component of 40 $f_H$ is extracted by an LPF 17. Thus, a low-frequency conversion chrominance signal in the VHS system is obtained. This low-frequency conversion chrominance signal is supplied to a recording head 18 of the video tape recorder in superposition with a luminance signal as is well-known.

When the carrier chrominance signal supplied to the input 1 includes jitter during dubbing, such jitter is also included in the color burst signal extracted from the burst gate 3 and the signal which is synchronous with the horizontal synchronizing signal supplied to the input 2. Therefore, the jitter of the carrier chrominance signal is cancelled, in the multiplier 16, by the jitter in the output signal from the BPF 15.

The conventional low-frequency converter for a carrier chrominance signal as hereinabove described has the following disadvantages:

(i) The structure is complicated with a large number of components, so that the size of the circuit is inevitably increased.

(ii) A large number of spurious components are contained in the output signal of the multiplier 14, which is the sub-balanced modulator. These spurious components are mainly frequency components of the sum of or the difference between the output signal from the VCO 6 and a spurious component in the signal having the frequency of 40 $f_H$ outputted as the result of multiplication of the signal which is synchronous with the horizontal synchronizing signal by the PLL circuit 8 and frequency division of the synchronous signal by the frequency divider 13. Such spurious components cannot be sufficiently removed by the BPF 15, and hence unwanted, noise causing components are generated in the output from the multiplier 16.

FIG. 2 is a frequency spectrum diagram of signals in the low-frequency converter shown in FIG. 1, wherein symbols B1 and B2 denote bands of BPF 15 and LPF 17, respectively. The output signal from the multiplier 14 includes spurious components in the vicinity of the frequency $f_{SC} + 40 f_H$, which are caused by a sixfold component of the signal having the frequency 40 $f_H$. That is $$40 f_H \times 6 - 3.58 MHz = 3.774 MHz - 3.58 MHz = 194 KHz$$

and the spurious components $$4.21 MHz \pm 194 KHz \text{ and } 4.21 MHz \pm 2 \times 194 KHz \text{ etc.}$$

result from intermodulation of the components 194 KHz and 4.21 MHz ($f_{SC}+40f_H$). This spurious components are converted into a low-frequency range and remain in the output signal of the LPF 17 as frequency component $$629KHz \pm 194KHz \text{ and } 629KHz \pm 2 \times 194KHz \text{ etc.}$$

where 629 KHz is equal to $40f_H$. This frequency componets cause color noise during reproducing so that picture quality is deteriorated.

SUMMARY OF THE INVENTION

A low-frequency converter for a carrier chrominance signal according to the present invention includes a frequency converter for frequency-converting a signal which is synchronous with a horizontal synchronizing signal in order to output a continuous wave signal having a frequency equal to the sum of or the difference between the frequency of a carrier chrominance signal and a low-frequency conversion chrominance signal. A multiplier multiplies the carrier chrominance signal by the continuous wave signal and the low-frequency conversion chrominance signal is extracted from an output signal of the multiplier.

The multiplier employed in the present invention receives a signal created by the frequency converter as well as a carrier chrominance signal in order to generate a low-frequency conversion chrominance signal, to enable the elimination of the use of a burst gate for extracting a color burst signal from a carrier chrominance signal. Also eliminated is the PLL circuit for obtaining a continuous wave signal of the same frequency and phase with the color burst signal and a multiplier serving as a sub-balanced modulator as well as a BPF for filtering an output signal of the multiplier. Each of these items were required in prior art configurations.

Accordingly, an object of the present invention is to provide a low-frequency converter for a carrier chrominance signal, which can reduce its circuit scale, which does not generate undesirable spurious component and which can sufficiently cancel jitter of an input carrier chrominance signal.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
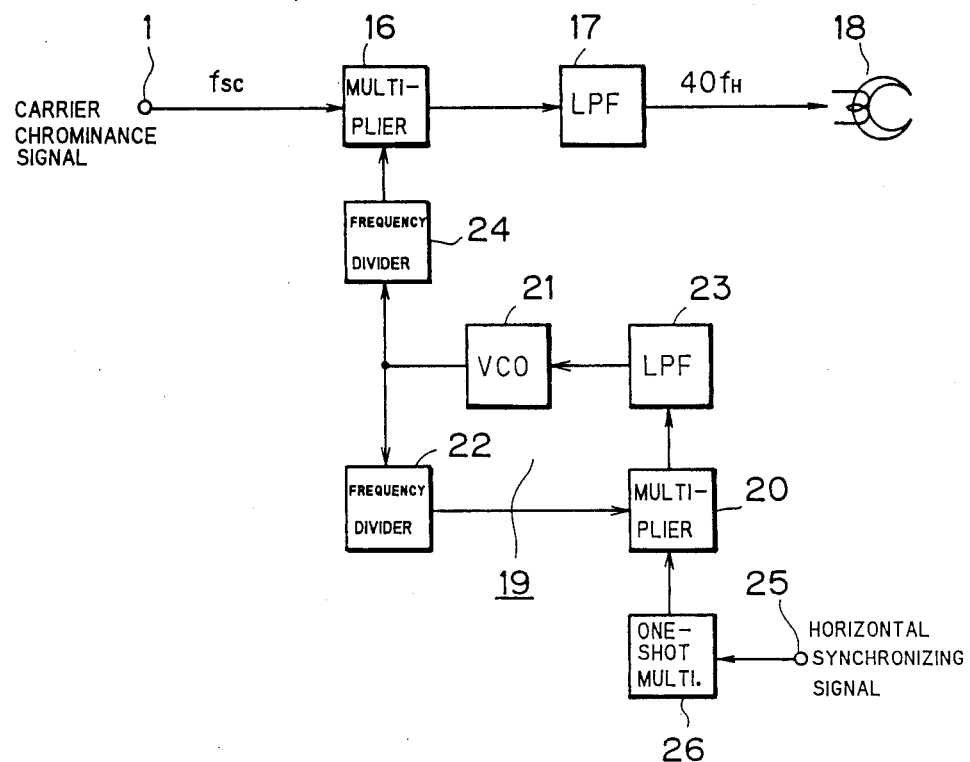
FIG. 3 is a block diagram showing an embodiment of a low-frequency converter for a carrier chrominance signal according to the present invention.

FIG. 3 is a block diagram showing an embodiment of a low-frequency converter for a carrier chrominance signal according to the present invention. Referring to FIG. 3, an input terminal 1 receives a carrier chrominance signal having a color subcarrier frequency $f_{sc}$ and another input terminal 25 receives a horizontal synchronizing signal having a horizontal synchronizing frequency $f_H$. A one-shot multivibrator 26 is triggered by the horizontal synchronizing signal to output a signal which is synchronous with the horizontal synchronizing signal.

The carrier chrominance signal received at the input 1 is supplied to a multiplier 16. The signal, which is synchronous with the horizontal synchronizing signal, is fed to a multiplier 20 of a PLL circuit 19. The multiplier 20 multiplies the signal, which is synchronous with the horizontal synchronizing signal, by a signal obtained through frequency division, by divider 22, of an output signal from a VCO 21, in order to provide phase detection. Only a low-frequency component of the phase detection output is supplied to a control input of the VCO 21 through an LPF 23.

The divisional ratio of the frequency divider 22 may typically be selected at 1/535. In this case, the output signal from the VCO 21 is stabilized at the same phase as the horizontal synchronizing signal at a frequency of $535f_H$. The output signal from the VCO 21 is frequency-divided by a frequency divider 24. The divisional ratio of the frequency divider 24 may be selected at $\frac{1}{2}$, so that a signal having a frequency of $$535f_H \times \frac{1}{2}$$

is obtained at its output. This output signal is directly supplied to the multiplier 16.

The multiplier 16 multiplies the output signal from the frequency divider 24 by the carrier chrominance signal having a color subcarrier frequency $f_{SC}$. In the NTSC system, the color subcarrier frequency $f_{SC}$ and the horizontal synchronizing frequency $f_H$ have the following relation:

$$f_{SC}=(455/2)\cdot f_H$$

In this case, the multiplier 16 outputs a signal including two frequency components of $$(535/2)f_H+(455/2)f_H=495f_H \text{ and}$$

$$(535/2)f_H-(455/2)f_H=40f_H.$$

Within this signal, only the frequency component of $40 f_H$ is extracted by an LPF 17, so that a low-frequency conversion chrominance signal in the VHS system is obtained. The low-frequency conversion chrominance signal is supplied to a recording head 18 of a video tape recorder in superposition with a luminance signal.

When a carrier chrominance signal supplied to the input 1 includes jitter during dubbing, such jitter is also included in a signal which is synchronous with the horizontal synchronizing signal, and which is obtained from the same signal source along with the carrier chrominace signal and supplied to the input 25. Therefore, the output from the VCO 21 of the PLL circuit 19 includes the jitter, whereby the jitter is cancelled in the multiplier 16, which is the main balanced modulator, similar to the conventional case.

Figure 1:
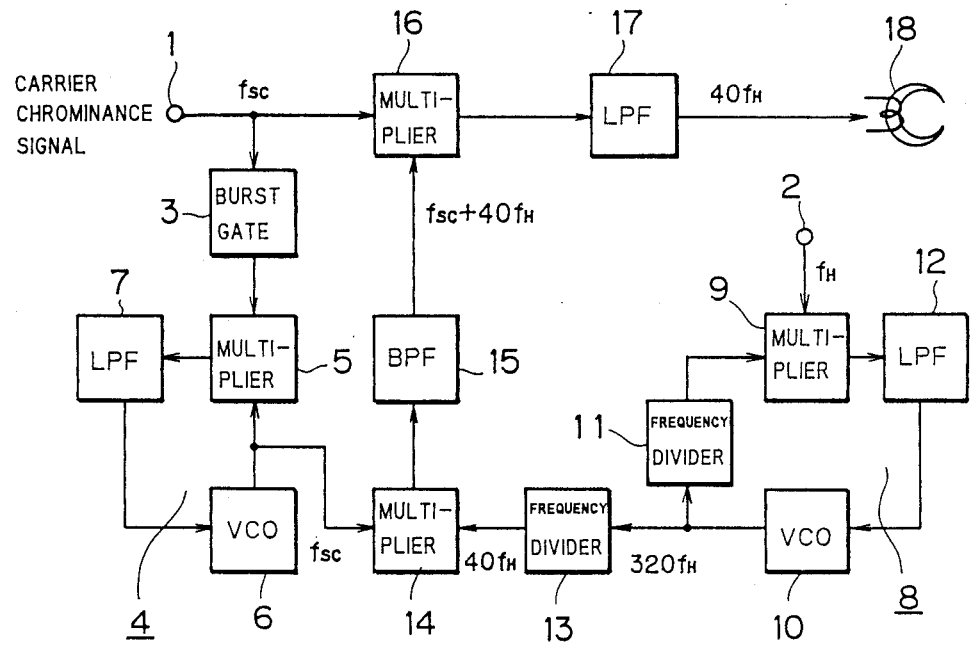
FIG. 1 is a block diagram showing a conventional low-frequency converter for a carrier chrominance signal.
Figure 2:
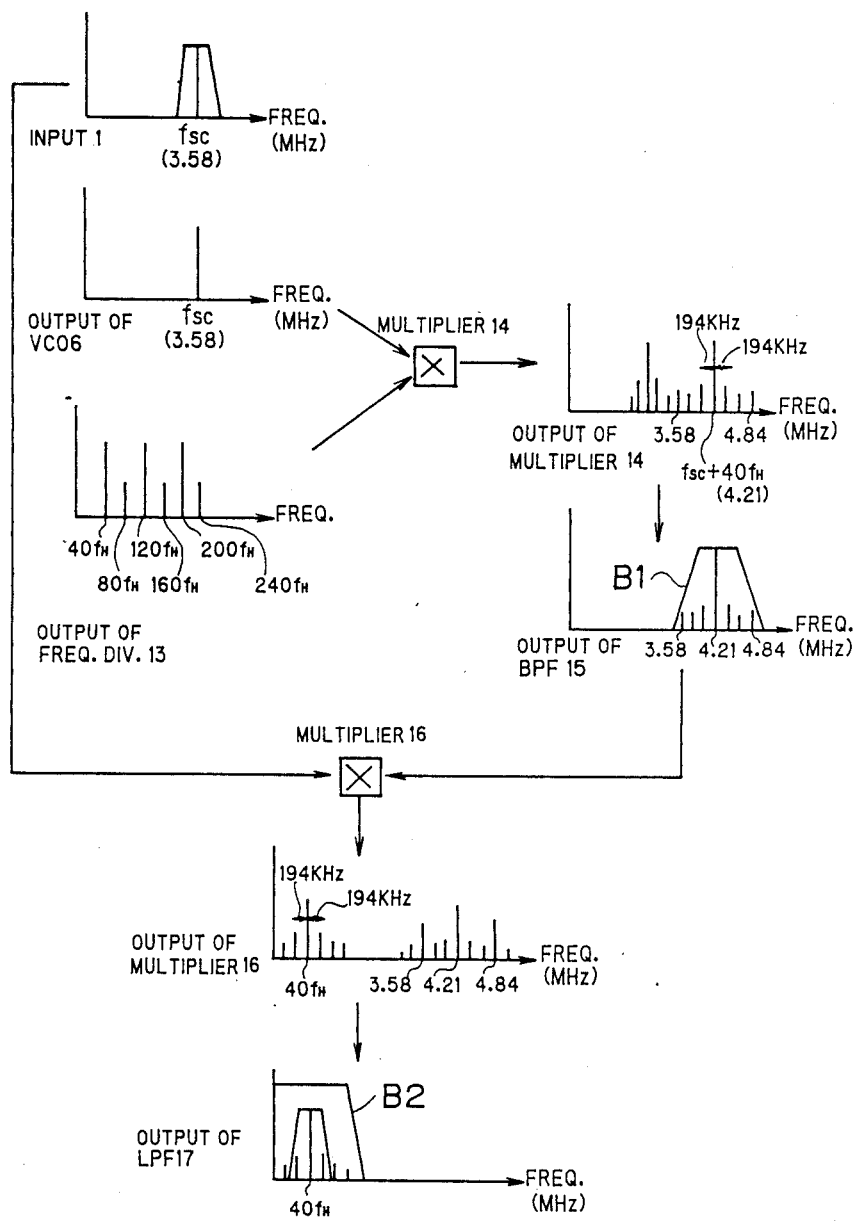
FIG. 2 is a frequency spectrum diagram of signals in the low-frequency converter shown in FIG. 1.

The above described embodiment has the following advantages:

(i) The burst gate 3 for extracting the color burst signal from the carrier chrominance signal, the PLL circuit 4 for obtaining the continuous wave signal of the same frequency and phase with the color burst signal, the multiplier 14 which serves as the sub-balanced modulator, and the BPF 15 in the conventional converter illustrated in FIG. 1 can all be omitted. Therefore, the structure becomes simple and the number of parts and the circuit scale can be reduced. In a practical use, 500 elements, four external parts and five pins of an integrated circuit was reduced, so that the cost of a video tape recorder was greatly lowered.

(ii) The output signal of the frequency divider 24 includes only small undesirable spurious components, since the output signal from the VCO 21 is directly supplied to the frequency divider 24. Such components have frequencies which are an integral multiple of the frequency of $(535/2)f_H$ of the output signal, i.e., relatively high frequency components. Therefore, the influence exerted by these components can be completely removed by the LPF 17. Thus, the low-frequency conversion chrominance signal has an excellent signal-to-noise ratio.

Figure 4:
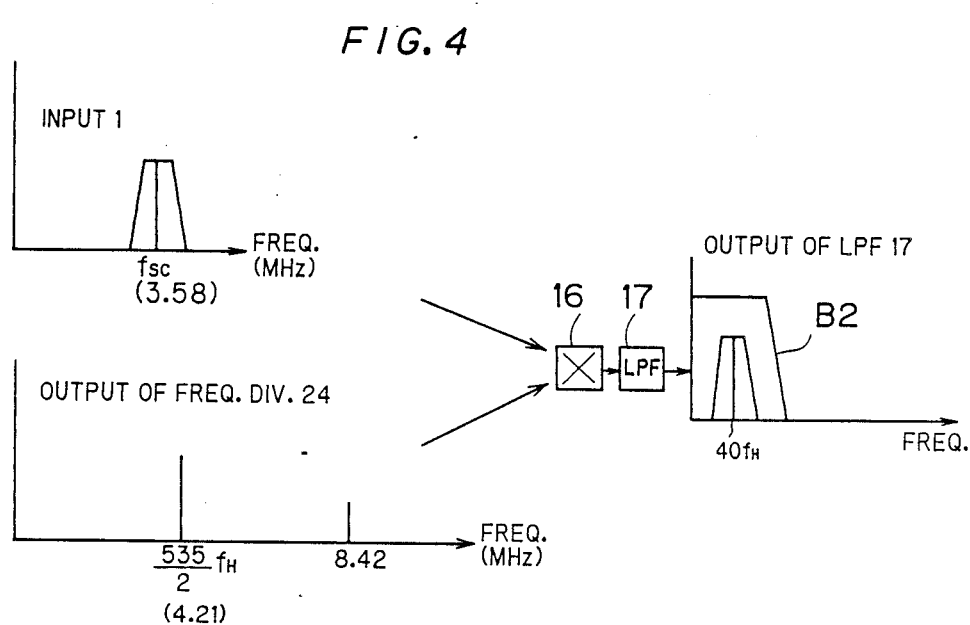
FIG. 4 is a frequency spectrum diagram of signals in the low-frequency converter shown in FIG. 3.

FIG. 4 is a frequency spectrum diagram of signals in the low-frequency converter shown in FIG. 3. The output signal from the frequency divider 24 includes the basic component of 4.21 MHz ($f_{SC}+40f_H=(535/2)f_H$) and higher harmonic components of 8.42 MHz, 12.63 MHz . . . . Therefore, the output signal from the multiplier 16 includes no spurious component in the vicinity of the frequency $40f_H$. Thus, the output signal from the LPF 17 has no spurious component, so that picture quality during reproducing can be greatly improved.

In general, the multiplication factor of the PLL circuit 19 and the divisional ratio of the frequency divider 24 can be appropriately selected so that the output signal from the frequency divider 24 has the frequency of $(535/2)f_H$.

In the case of employing a crosstalk cancel system of PS or PI, a phase transition circuit may be provided between the frequency divider 24 and the multiplier 16.

Although each of the above embodiment has been described with reference to the case of recording a color video signal of the NTSC system by a video tape recorder of the VHS system, the present invention is also applicable to a color video signal and a video tape recorder of other systems, as a matter of course. Further, a signal having a frequency equal to the difference between the frequencies of the carrier chrominance signal and the low-frequency conversion chrominance signal may be input in the multiplier 16, which is the main balanced modulator, together with the carrier chrominance signal, in place of the signal having a frequency equal to the sum of such frequencies.

Figure 5:
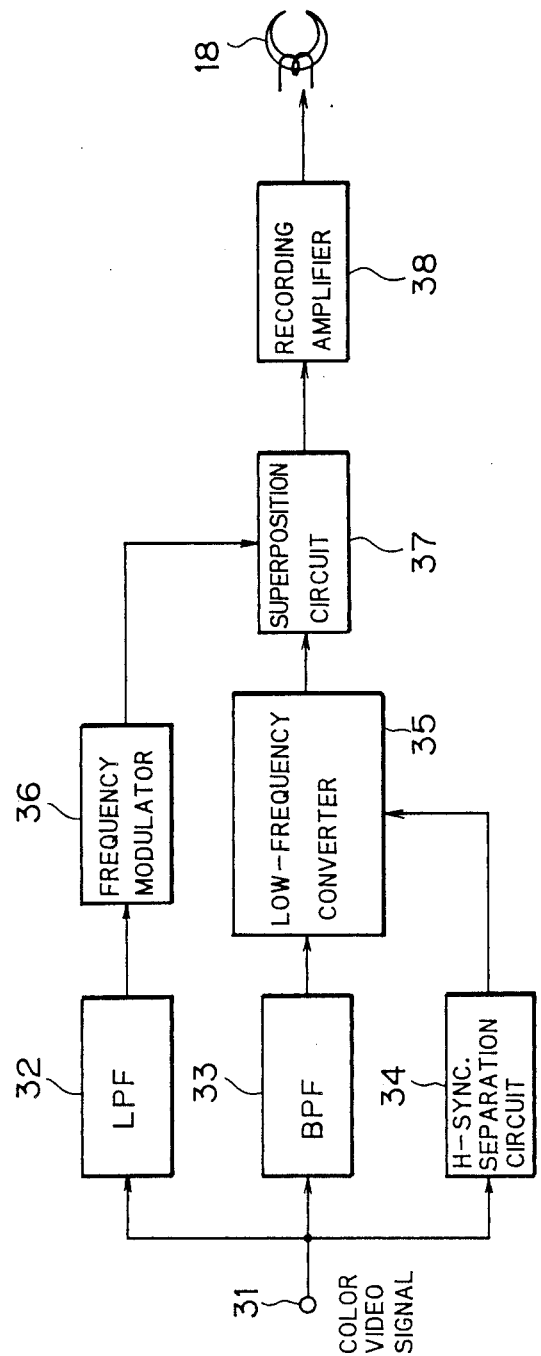
FIG. 5 is a block diagram showing a recording system in a video tape recorder.

FIG. 5 is a block diagram showing a recording system in a video tape recorder, to which the low-frequency converter according to the present invention is applied. Referring to FIG. 5, a color video signal is supplied to an input terminal 31. An LPF 32 and a BPF 33 receive the color video signal to extract a luminance signal and a carrier chrominance signal from the color video signal, respectively. The color video signal is also fed to an h-sync separation circuit 34, which separate a horizontal synchronizing signal from the color video signal and feed it to a low-frequency converter 35. The luminance signal is frequency-modulated by a frequency modulator 36. The carrier chrominance signal is frequency-converted by the low-frequency converter 35 to be a low-frequency conversion chrominace signal. The low-frequency converter 35 may have the structure shown in FIG. 3. Output signals from the low-frequency converter 35 and the frequency modulator 36 are fed to a superposition circuit 37 to be superposed. The output signal from the superposition circuit 37 is amplified by a recording amplifier 38 to be fed to a recording head 18.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A low-frequency converter for frequency-converting a carrier chrominance signal having a first frequency of a predetermined relation with respect to a horizontal synchronizing frequency into a low-frequency range in order to obtain a low-frequency conversion chrominance signal having a second frequency of a predetermined relation with respect to the horizontal synchronizing frequency, comprising:

first input means for receiving said carrier chrominance signal;

second input means for receiving a synchronizing signal wherein said synchronizing signal is synchronous with horizontal synchronizing signal having the horizontal synchronizing frequency;

frequency conversion means connected to said second input means for frequency-converting said synchronizing signal wherein the output of said frequency conversion means is a continuous wave signal having a third frequency;

a multiplier means connected to said first input means and connected directly to said frequency conversion means for multiplying said carrier chrominance signal by said continuous wave signal and outputting a multiplied signal having a frequency equal to one of the sum of and the difference between said first and third frequency; and extracting means connected to said multiplier means for extracting said low-frequency conversion chrominance signal having said second frequency from said multiplier output signal.

2. A low-frequency converter for a carrier chrominance signal in accordance with claim 1, wherein said frequency conversion means further includes a phase-locked-loop circuit which is phase-locked in order to multiply said synchronizing signal.

3. A low-frequency converter for a carrier chrominance signal in accordance with claim 2, wherein said frequency conversion means further includes a frequency divider for frequency-dividing an output signal from said phase-locked-loop circuit.

4. A low-frequency converter for a carrier chrominance signal in accordance with claim 3, wherein said carrier chrominance signal is in a NTSC system, said phase-locked-loop circuit has a multiplication factor of 535, and said frequency divider has a divisional ratio of $\frac{1}{4}$.

5. A video tape recorder for recording a color video signal, including a carrier chrominance signal having a first frequency of a predetermined relation with respect to a horizontal synchronizing frequency and a horizontal synchronizing signal having said horizontal synchronizing frequency, on a magnetic tape, wherein said system includes a low-frequency converter for frequency-converting said carrier chrominance signal in said color video signal to obtain a low-frequency conversion chrominance signal having a second frequency of a predetermined relation with respect to said horizontal synchronizing frequency, comprising:

input means for receiving said color video signal;

first separation means connected to said input means for separating said carrier chrominance signal from said color video signal;

second separation means connected to said input means for separating said horizontal synchronizing signal from said color video signal;

synchronizing signal generating means connected to said second separation means for generating a synchronizing signal which is synchronized with said horizontal synchronizing signal;

frequency converting means connected to said synchronizing signal generating means for frequency converting said synchronizing signal and to provide an output which is a continuous wave signal having a third frequency;

a multiplier means connected to said first separation means and said frequency converting means for multiplying said carrier chrominance signal by said continuous wave signal and outputting a multiplied signal having a frequency equal to one of the sum of and the difference between said first and third frequency; and means for extracting said low-frequency conversion chrominance signal having said second frequency from said multiplier output signal.

6. A video tape recorder in accordance with claim 5, wherein said frequency converting means further includes a phase-locked-loop circuit which is phase-locked in order to multiply said synchronizing signal.

7. A video tape recorder in accordance with claim 6, wherein said frequency converting means further includes a frequency divider for frequency-dividing an output signal from said phase-locked-loop circuit.

8. A video tape recorder in accordance with claim 7, wherein said carrier chrominance signal is in a NTSC system, said phase-locked-loop circuit has a multiplication factor of 535, and said frequency divider has a divisional ratio of ½.

* * * * *